United States Patent
Pita-Gil et al.

(10) Patent No.: US 10,077,057 B2
(45) Date of Patent: Sep. 18, 2018

(54) METHOD AND DEVICE FOR ESTIMATING THE INTERVAL WHICH CONTAINS THE TOTAL WEIGHT OF A MOTOR VEHICLE

(71) Applicant: RENAULT s.a.s., Boulogne-Billancourt (FR)

(72) Inventors: Guillermo Pita-Gil, Paris (FR); Giovanni Granato, Vanves (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 106 days.

(21) Appl. No.: 15/101,833

(22) PCT Filed: Dec. 2, 2014

(86) PCT No.: PCT/FR2014/053107
§ 371 (c)(1),
(2) Date: Jun. 3, 2016

(87) PCT Pub. No.: WO2015/082822
PCT Pub. Date: Jun. 11, 2015

(65) Prior Publication Data
US 2016/0375909 A1   Dec. 29, 2016

(30) Foreign Application Priority Data
Dec. 3, 2013 (FR) .................................. 13 61998

(51) Int. Cl.
*B60W 40/13* (2012.01)
*G01G 19/02* (2006.01)
*G01G 19/08* (2006.01)

(52) U.S. Cl.
CPC ............ *B60W 40/13* (2013.01); *G01G 19/02* (2013.01); *G01G 19/086* (2013.01); *B60W 2400/00* (2013.01)

(58) Field of Classification Search
CPC .............. B60W 40/13; B60W 2400/00; G01G 19/086; G01G 19/02
See application file for complete search history.

(56) References Cited

U.S. PATENT DOCUMENTS 7,092,844 B1 * 8/2006 Young .................... G06F 17/18
                                                                 702/176
2004/0181317 A1   9/2004 Flechtner et al.
(Continued)

FOREIGN PATENT DOCUMENTS

| DE | 10 2005 062 282 A1 | 6/2007 |
| DE | 10 2006 045 305 B3 | 1/2008 |
| EP | 1 935 733 A1 | 6/2008 |

OTHER PUBLICATIONS

International Search Report dated Mar. 12, 2015 in PCT/FR14/053107 Filed Dec. 2, 2014.
(Continued)

*Primary Examiner* — John Breene
*Assistant Examiner* — Mohammad Islam
(74) *Attorney, Agent, or Firm* — Oblon, McClelland, Maier & Neustadt, L.L.P.

(57) ABSTRACT

A method for estimating the interval within which the total weight of an automobile vehicle is situated includes defining at least two intervals of weights, including determining a first situation in which the total weight of the vehicle belongs to the first interval and a second situation in which the total weight of the vehicle belongs to the second interval, calculating probabilities of being in the first or second situation knowing a value of the weight, calculating a risk of choosing the wrong interval as a function of the calculated probabilities and of a cost associated with an erroneous decision, and determining the interval within which the total weight of the vehicle is situated as a function of the risk.

12 Claims, 1 Drawing Sheet

(56) References Cited

U.S. PATENT DOCUMENTS

| | | | |
|---|---|---|---|
| 2005/0010356 A1* | 1/2005 | Ishiguro | F16H 59/52 |
| | | | 701/124 |
| 2006/0108154 A1 | 5/2006 | Mack et al. | |
| 2007/0136040 A1* | 6/2007 | Tate, Jr. | B60W 40/09 |
| | | | 703/8 |
| 2009/0187527 A1* | 7/2009 | Mcaree | E02F 9/226 |
| | | | 706/52 |
| 2009/0204318 A1* | 8/2009 | Nimmo | B60G 17/0162 |
| | | | 701/124 |
| 2010/0036561 A1 | 2/2010 | Jung et al. | |
| 2011/0066322 A1* | 3/2011 | Karlsson | B60T 8/172 |
| | | | 701/33.4 |
| 2011/0172877 A1 | 7/2011 | Dourra et al. | |
| 2014/0244120 A1* | 8/2014 | Fujii | B60W 10/06 |
| | | | 701/58 |
| 2014/0278041 A1* | 9/2014 | Brenninger | B60W 40/13 |
| | | | 701/124 |
| 2015/0039216 A1* | 2/2015 | Czaja | B60T 8/17551 |
| | | | 701/124 |
| 2015/0105213 A1* | 4/2015 | Wright | B60W 40/13 |
| | | | 477/3 |
| 2015/0367857 A1* | 12/2015 | Kozuka | B60W 40/13 |
| | | | 701/70 |
| 2017/0146801 A1* | 5/2017 | Stempora | G02B 27/0172 |

OTHER PUBLICATIONS

French Search Report dated Jul. 21, 2014 in French Application 1361998 Filed Dec. 3, 2013.

\* cited by examiner

METHOD AND DEVICE FOR ESTIMATING THE INTERVAL WHICH CONTAINS THE TOTAL WEIGHT OF A MOTOR VEHICLE

BACKGROUND

The present invention relates to a method and a device for estimating the total weight of an automobile vehicle.

The knowledge of the total weight of an automobile vehicle is needed for the correct operation of numerous devices onboard the vehicle, notably the devices for managing braking, for managing an automatic transmission or for managing the stiffness of the suspensions. Indeed, the greater the load of the vehicle, the stiffer the suspensions become in order to ensure the comfort and the safety of the passengers. Furthermore, for utility vehicles offering a high loading capacity, an estimation of the weight of the vehicle allows the user to guarantee compliance with the total laden weight authorized.

It is therefore desirable to obtain a quick and reliable estimation of the weight of the vehicle.

Today, the estimation of the weight of an automobile vehicle may be carried out in various ways, for example by a direct measurement of the weight by means of sensors for displacement of the suspensions and using the knowledge of the stiffness of the shock absorbers. However, these methods are expensive because they require the installation and the calibration at the factory of displacement sensors. Moreover, the dispersion in manufacturing and in aging of the stiffness of the suspensions does not allow a precise estimation of the weight to be obtained.

There also exist methods for estimation of the weight of an automobile vehicle by application of the fundamental principle of dynamics.

In this respect, reference may be made to the document U.S. Pat. No. 6,249,735 which describes a method for estimating the state of loading of a vehicle as a function of the measured torque of the engine and of the acceleration of the vehicle calculated by discrete approximation of the derivative of the speed and by filtering. Such a method does not allow a sufficiently reliable and robust estimation of the weight.

Reference may also be made to the document FR 2 857 090 which describes a method for estimating the weight based on a recursive least-squares algorithm using the acceleration of the vehicle. However, such an estimation method does not allow a quick estimation of the weight of the automobile vehicle.

Moreover, the methods for estimating the weight of an automobile vehicle by application of the fundamental principle of dynamics at a single moment in time are particularly imprecise and onerous to implement because they require an estimation of numerous parameters of the vehicle and are based on assumptions which are not always verified, such as a zero wind speed, an inclination of zero, etc.

Furthermore, in some current vehicles, the user must press a control button when the vehicle is loaded. The control button will subsequently activate a program for controlling the processor of the automatic transmission adapted to a loaded or unloaded vehicle, referred to as "nominal". However, the installation of such a control button is relatively costly.

However, none of these documents allows it to be defined quickly whether the vehicle is lightly or heavily loaded, and hence to determine a given interval of weight of the vehicle, without determining its exact value.

BRIEF SUMMARY

The purpose of the present invention is therefore to overcome these drawbacks.

The aim of the invention is therefore to provide a method and a device allowing an interval to be quickly determined within which the total weight of the automobile vehicle is situated, while at the same time being low cost and simple to implement.

The term 'interval' or 'class' of weight is understood to mean a range defined by a set of weights bounded by a maximum weight and a minimum weight.

In one embodiment, the invention relates to a method for estimating the class to which the total weight of an automobile vehicle belongs, in other words the interval within which the total weight of an automobile vehicle is situated. The estimation method comprises a step in which at least two intervals of weights are defined, a first situation is determined in which the total weight of the vehicle belongs to the first interval and a second situation is determined in which the total weight of the vehicle belongs to the second interval. The estimation method furthermore comprises a step for calculating the probabilities of respectively being in the first or the second situation knowing a value of the weight, a step for calculating the risk of choosing the wrong interval as a function of the calculated probabilities and of the cost associated with an erroneous decision and a step for determining the interval within which the total weight of the vehicle is situated as a function of the risk.

Advantageously, in order to calculate the probabilities of respectively being in the first or the second situation knowing a value of the weight, a set of estimations of weight is defined using a database containing driving profiles, the probability that a value from the set of weights is situated in the first situation is calculated, the probability that a value from the set of weights is situated in the second situation is calculated, the probabilities of being in the first or second situation are determined and the probability of finding a value of weight in all the situations for all the types of driving is calculated.

An algorithm using the Bayes theorem may, for example, be used in order to obtain the probabilities of being in the first or second situation knowing a value of the weight.

In one embodiment, the risk is calculated as a function of the value of instantaneous mass. The instantaneous mass corresponds to the sum of the forces applied to the vehicle divided by the longitudinal acceleration of the vehicle. 'Forces' are understood to mean the aerodynamic force, the resistance force of the road on the wheels, the resultant of the engine torque transferred to the wheels and the braking friction.

In another embodiment, the risk is calculated as a function of the set of the estimated values of instantaneous mass, for example calculated using an algorithm based on Newton's second law.

Advantageously, the interval within which the total weight of the vehicle is situated is determined by comparing the risks and by choosing the lowest risk.

According to a second aspect, the invention relates to a device for estimating the interval within which the total weight of an automobile vehicle is situated, comprising a module for determining at least two intervals of weights: a first situation in which the total weight of the vehicle belongs to the first interval and a second situation in which the total weight of the vehicle belongs to the second interval. Said estimation device comprises a module for calculating the probabilities of being in the first or second situation knowing a value of the weight, a module for calculating the risk of choosing the wrong interval as a function of the calculated probabilities and of the cost associated with an erroneous decision and a module for determining the interval within which the total weight of the vehicle is situated as a function of the risk.

Advantageously, the module for calculating the probabilities comprises a module for determining a set of estimations of weight using a database containing driving profiles and a calculation module designed to calculate the probability that a value from the set of weights is situated in the first situation, the probability that a value from the set of weights is situated in the second situation, the probabilities of being in the first or second situation and the probability of finding a value of weight in all the situations for all the types of driving.

The module for calculating the probabilities of being in the first or second situation knowing a value of the weight comprises, for example, a module for application of an algorithm using the Bayes theorem.

In one embodiment, the risk is calculated as a function of the set of the estimated values of instantaneous mass.

BRIEF DESCRIPTION OF THE DRAWINGS

Other aims, features and advantages of the invention will become apparent on reading the following description, presented solely by way of non-limiting example, and with reference to the appended drawings, in which.

DETAILED DESCRIPTION

Figure 1:
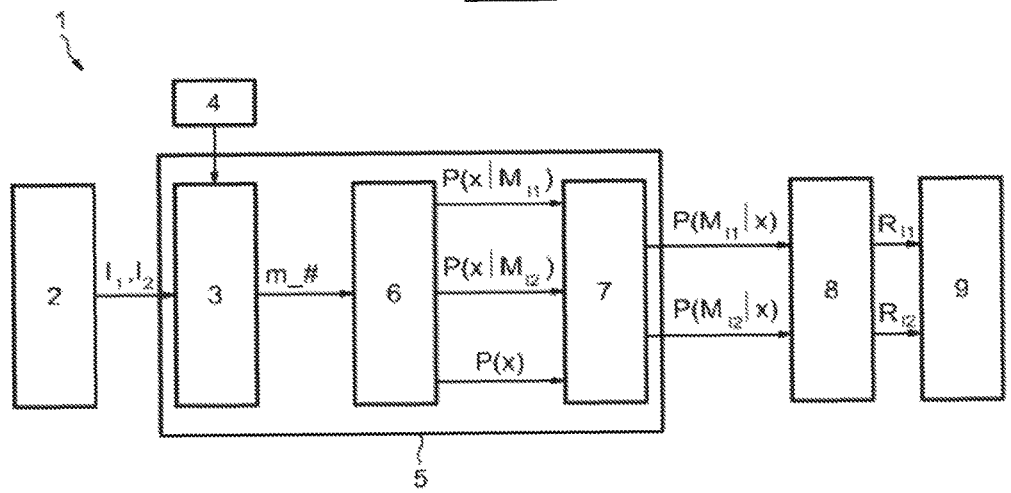
FIG. 1 shows schematically the device for estimating the class to which the total weight of a vehicle belongs according to the invention.

The invention allows the class to which the weight of an automobile vehicle belongs to be determined, in other words in which weight class the weight of the vehicle belongs. A weight class is an interval of weights, for example in the range between 1900 kg and 2000 kg.

In the following, a first interval of weights $I_1$ is defined, for example between 0 kg and 1850 kg, and a second interval of weights $I_2$ is defined, for example between 1850 kg and 3000 kg. It will be noted that a greater number of intervals of weights, and intervals of weights of variable size, could be provided.

A first situation $M_{f1}$ is thus defined corresponding to the case where the total weight m of the vehicle is situated within the interval $I_1$, and a second situation $M_{f2}$ is thus defined corresponding to the case where the weight m of the vehicle is situated within the interval $I_2$.

The device 1 for estimating the class to which the weight m of the vehicle belongs comprises a module 2 for defining the intervals of weights $I_1$, $I_2$ and situations $M_{f1}$ and $M_{f2}$, a module 5 for calculating conditional probabilities, a module 8 for estimating the risk of making an error and a decision-making module 9.

The module 5 for calculating conditional probabilities comprises a module 3 for determining, by means of a database 4 containing driving profiles, a set of estimations of weight m_#.

The determination module 3 comprises an algorithm using Newton's second law in order to calculate theoretically, as a function of the driving data, the estimations of instantaneous masses of the vehicle according to the following equation:

$$m = \frac{\Sigma F(t)}{a(t)} \quad \text{(Eq. 1)}$$

with:

m, the theoretical instantaneous mass of the vehicle, expressed in kg;

a(t), the instantaneous acceleration of the vehicle, expressed in m·s$^{-2}$; and F(t), the set of instantaneous forces applied to the vehicle, expressed in N.

A set of estimations of weight m_# is thus obtained for a given driving condition depending on the situation being considered, in other words for the first situation $M_{f1}$ corresponding to the case where the weight m of the vehicle is situated within the interval $I_1$, and for the second situation $M_{f2}$ corresponding to the case where the weight m of the vehicle is situated within the interval $I_2$.

The module 5 for calculating conditional probabilities subsequently comprises a module 6 for calculating the set of the conditional probabilities $P(x|M_{f1})$ for a value of weight x in the set of estimations of weight m_# in the first situation $M_{f1}$ according to the following equation:

$$P(x|M_{f1}) = N(x)/N(m\_\#) \quad \text{(Eq.2)}$$

with:

N(x), the number of times that the value x is in the set m_#; and

N(m_#), the total number of elements in the set m_#.

In an identical manner, the calculation module 6 calculates the set of the conditional probabilities $P(x|M_{f2})$ for a value of weight x in the set of estimations of weight m_# in the second situation $M_{f2}$.

Subsequently, the calculation module 6 determines the probabilities $P(M_{f1})$ and $P(M_{f2})$ of being in the first or second situation $M_{f1}$ or $M_{f2}$.

For example, the probabilities $P(M_{f1})$ and $P(M_{f2})$ may be supplied by the manufacturer according to the vehicle and as a function of the loading, for example with a plurality of individuals or with goods, etc.

With this information, the calculation module 6 determines the probability of finding a value of weight x in all the driving situations $M_{f1}$ and $M_{f2}$:

$$P(x) = P(x|M_{f1})*P(M_{f1}) + P(x|M_{f2})*P(M_{f2}) \quad \text{(Eq.3)}$$

In order to know the probability of being in the situation $M_{f1}$ or $M_{f2}$ knowing a value of weight x, the module 5 for calculating conditional probabilities comprises a module 7 containing an algorithm using the Bayes theorem so as to obtain the following equations:

$$P(M_{f1}|x) = P(x|M_{f1})*P(M_{f1})/P(x) \quad \text{(Eq.4)}$$

$$P(M_{f2}|x) = P(x|M_{f2})*P(M_{f2})/P(x) \quad (Eq.5)$$

The conditional probabilities $P(M_{f1}|x)$ and $P(M_{f2}|x)$ allow the following question to be answered: given any value of weight m, what is the probability that the vehicle is in the situation $M_{f1}$ or $M_{f2}$? These conditional probabilities are calculated offline and are sent to the decision-making module 9. The term "offline" refers to the driving phases during the development and set up.

The module 8 for estimating the risk of making an error R receives information on the cost C and on the conditional probability calculated by the module for calculating the probabilities 5.

The wrong choice of a situation $M_{fn}$, whereas the weight m of the vehicle is situated within an interval $I_{n+1}$, involves a cost C which may lead to the degradation of the comfort and of the safety of the user.

The cost of making an error by choosing the situation $M_{f1}$, whereas the weight m of the vehicle is situated within the interval $I_2$, will be denoted $C_{f1}$, and $C_{f2}$ will be the cost of making an error by choosing the situation $M_{f2}$, whereas the weight m of the vehicle is situated within the interval $I_1$.

The risk R of an event is defined as being its cost C multiplied by the probability of the occurrence of this event.

The risk R may be calculated by two different methods:

The first method consists in calculating the instantaneous risk R knowing the value of the instantaneous mass m_t according to the following equations.

$$R_{f2}=P(M_{f1}|m\_t)*C_{f2} \quad (Eq.6)$$

$$R_{f1}=P(M_{f2}|m\_t)*C_{f1} \quad (Eq.7)$$

The second method uses the values of estimation of the weight m_t, m_t–1, m_t–2 . . . , m_1 determined by an algorithm using Newton's law at each time t, t–1, t–2 . . . . It will be noted that any other algorithm allowing the weight of the vehicle to be estimated could be used.

The following may be defined:

$$Xt=\{m\_t, m\_t-1, m\_t-2, \ldots, m\_\}.$$

with Xt, the set of the estimations of the weight m of the vehicle.

In order to calculate the probability P(M|Xt) of being in the situation $M_{f1}$, or $M_{f2}$ knowing the set Xt, the assumption is made that the values in the set Xt are random values, randomly chosen under the same conditions, in other words identically distributed and independent:

$$P(M|X_t) = \frac{1}{P(M)^{t-1}} \prod_{j=1}^{t} P(M|m_j) \quad (Eq. 8)$$

The equation 8 may be written in a recursive form:

$$P(M|X_t) = \frac{P(M|m_t)}{P(M)} P(M|X_{t-1}) \quad (Eq. 9)$$

Thus, at the time t, the risk R of concluding that the weight is situated within an interval I, whereas it is not, is written according to the following equations:

$$R_{f2}=P(M_{f1}|Xt)*C_{f2} \quad (Eq.10)$$

$$R_{f1}=P(M_{f2}|Xt)*C_{f1} \quad (Eq.11)$$

This risk is updated at each time t.

The risks $R_{f2}$ and $R_{f1}$ are transmitted to the decision-making module 9. The decision-making module 9 compares the risks calculated by the risk determination module 8 and selects the lowest risk in order to determine within which interval $I_1$ or $I_2$ the total weight m of the automobile vehicle is situated.

Figure 2:
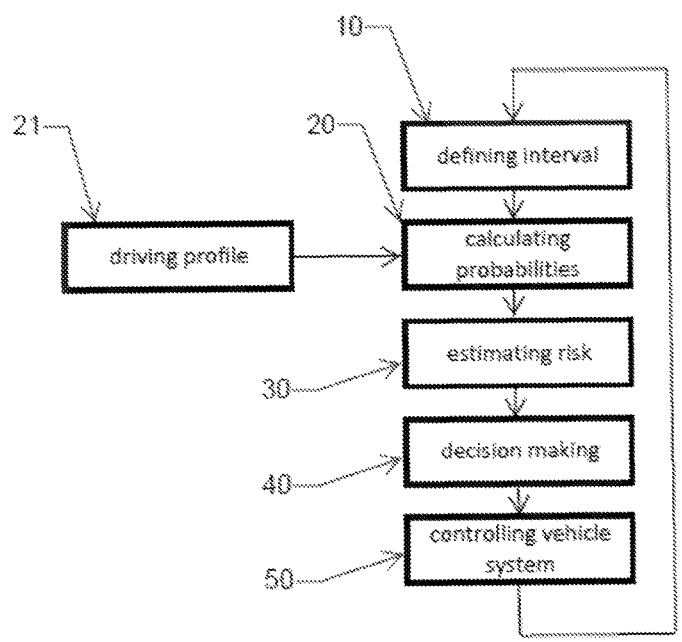
FIG. 2 illustrates the steps of the method for estimating the class to which the total weight of a vehicle belongs according to the invention.

As illustrated in FIG. 2, the method for estimating the class to which the weight m of the vehicle belongs comprises four main steps 10, 20, 30, 40: a first main step 10 for definition of the intervals of weights $I_1$, $I_2$ and of the situations $M_{f1}$ and $M_{f2}$, a second main step 20 for calculating conditional probabilities, a third main step 30 for estimating the risk of making an error and a fourth decision-making step 40.

The second main step 20 for calculating conditional probabilities comprises a step for determining, by means of a database 21 containing driving profiles, a set of estimations of weight m_#.

An algorithm based on Newton's law may for example be used in order to calculate theoretically the estimations of instantaneous masses of the vehicle according to the equation 1 defined with reference to FIG. 1.

A set of estimations of weight m_# is thus obtained for a given driving condition according to the current situation, in other words for the first situation $M_{f1}$ corresponding to the case where the weight m of the vehicle is situated within the interval $I_1$, and for the second situation $M_{f2}$ corresponding to the case where the weight m of the vehicle is situated within the interval $I_2$.

The set of the conditional probabilities $P(x|M_{f1})$ are subsequently calculated for a value of weight x in the set of estimations of weight m_# in the first situation $M_{f1}$ according to the following equation:

$$P(x|M_{f1})=N(x)/N(m\_\#) \quad (Eq. 2)$$

with:

N(x), the number of times that the value x is in the set m_#; and

N(m_#), the total number of elements in the set m_#.

In an identical manner, the set of the conditional probabilities $P(x|M_{f2})$ is calculated for a value of weight x in the set of estimations of weight m_# in the second situation $M_{f2}$.

Subsequently, the probabilities $P(M_{f1})$ and $P(M_{f2})$ of being in the first or second situation $M_{f1}$ or $M_{f2}$ are calculated.

For example, the probabilities $P(M_{f1})$ and $P(M_{f2})$ may be supplied by the manufacturer according to the vehicle and as a function of the loading, for example with a plurality of individuals or with goods, etc.

With this information, the probability of finding a value of weight x in all the driving situations $M_{f1}$ and $M_{f2}$ is calculated:

$$P(x)=P(x|M_{f1})*P(M_{f1})+P(x|M_{f2})*P(M_{f2}) \quad (Eq.3)$$

In order to know the probability of being in the situation $M_{f1}$ or $M_{f2}$ knowing a value of weight x, the Bayes formula is applied so as to obtain the following equations:

$$P(M_{f1}|x)=P(x|M_{f1})*P(M_{f1})/P(x) \quad (Eq.4)$$

$$P(M_{f2}|x)=P(x|M_{f2})*P(M_{f2})/P(x) \quad (Eq.5)$$

The conditional probabilities $P(M_{f1}|x)$ and $P(M_{f2}|x)$ allow the following question to be answered: given any value of weight m, what is the probability that the vehicle is in the condition $M_{f1}$ or $M_{f2}$. These conditional probabilities are calculated offline and are sent to the decision-making step 30.

The third main step 30 for estimating the risk R allows the risk of choosing a situation to be calculated whereas the total weight of the vehicle is situated within another interval of mass.

The erroneous choice of a situation $M_{fn}$, whereas the weight m of the vehicle is situated within the interval $I_{n+1}$, involves a cost C which may lead to the degradation of the comfort and of the safety of the user.

The cost of making an error by choosing the situation $I_1$, whereas the weight m of the vehicle is situated within the interval $I_2$, will be denoted $C_{f1}$, and $C_{f2}$ will be the cost of making an error by choosing the situation $I_2$, whereas the weight m of the vehicle is situated within the interval $I_1$.

The risk R of an event is defined as being its cost C multiplied by the probability of the occurrence of this event.

The risk R may be calculated by two methods:

The first method consists in calculating the instantaneous risk R knowing the value of the instantaneous mass m_t according to the following equations:

$$R_{f2}=P(M_{I1}|m\_t)*C_{f2} \quad (Eq.6)$$

$$R_{f1}=P(M_{I2}|m\_t)*C_{f1} \quad (Eq.7)$$

The second method allows the values of estimation of the weight m_t, m_t−1, m_t−2, . . . , m_1, determined by an algorithm based on Newton's law at each time t, to be used. It will be noted that any other algorithm allowing the weight of the vehicle to be estimated could be used.

The following may be defined:

$$Xt=\{m\_t, m\_t-1, m\_t-2, \ldots, m\_1\}.$$

with Xt, the set of the estimations of the weight of the vehicle.

In order to calculate the probability P(M|Xt) of being in the situation $M_{I1}$ or $M_{I2}$ knowing the set Xt, the assumption is made that the values in the set Xt are random values, chosen at random under the same conditions, in other words identically distributed and independent:

$$P(M \mid X_t) = \frac{1}{P(M)^{t-1}} \prod_{j=1}^{t} P(M \mid m_j) \quad (Eq.\ 8)$$

The equation 8 may be written in a recursive form:

$$P(M \mid X_t) = \frac{P(M \mid m_t)}{P(M)} P(M \mid X_{t-1}) \quad (Eq.\ 9)$$

Thus, at the time t the risk R of concluding that the weight is situated within an interval I, whereas it is not, is written according to the following equations:

$$R_{f2}=P(M_{I1}|Xt)*C_{f2} \quad (Eq.10)$$

$$R_{f1}=P(M_{I2}|Xt)*C_{f1} \quad (Eq.11)$$

This risk is updated at each time t.

In possession of this information, the decision with the least risk can be taken at the fourth step 40 by comparing the risks $R_{f1}$ and $R_{f2}$.

The decision-making step consists in choosing the solution which minimizes the risk, in other words the class of weight associated with the lowest risk is chosen.

Thus, it is possible to reliably know the range within which the total weight of the vehicle is situated.

Accordingly, having a very quick estimation of the class to which the weight of the vehicle belongs may be provided, to the detriment of the precision, for example with simply two or three weight classes. Controlled shock-absorber systems (more or less firm adjustment depending on the load of the vehicle), together with lighting systems (orientation of the beam adapted to the load in order not to dazzle other vehicles or pedestrians), do not require a high precision on the weight of the vehicle.

Other applications require a more precise estimation and hence more classes for categorizing the weight of the vehicle than in the preceding situation. The detection systems for overloading of the vehicle may notably be mentioned. In this case, the number of classes of weight can be greater the higher the desired precision, to the detriment of the time needed for such an estimation.

The two situations may be envisioned within the same vehicle, starting from two classes of weight, which allows first adjustments of various systems to be carried out, then refining the estimation of the weight by increasing the number of classes.

The invention claimed is:

1. A method for estimating an interval within which a total weight of an automobile vehicle is situated, comprising: defining at least two intervals of weights, including determining a first situation in which the total weight of the vehicle belongs to the first interval and a second situation in which the total weight of the vehicle belongs to the second interval; calculating probabilities of being in the first or second situation knowing a value of the weight; calculating a risk of choosing a wrong interval as a function of the calculated probabilities and of a cost associated with an erroneous decision, the wrong interval being an interval other than the interval within which the total weight of the vehicle is situated; determining the interval within which the total weight of the vehicle is situated as a function of the risk; and controlling at least one of an adjustment of shock-absorber system and an orientation lighting system of the vehicle in response to the determined interval within which the total weight of the vehicle is situated.

2. The estimation method as claimed in claim 1, in which, the calculating the probabilities includes defining a set of estimations of weights using a database containing driving profiles, calculating the probability that a value from the set of estimations of weights is situated in the first situation, calculating the probability that a value from the set of estimations of weights is situated in the second situation, determining the probabilities of being in the first or second situation, and calculating the probability of finding a value of weight in all situations for all types of driving.

3. The estimation method as claimed in claim 2, in which algorithm is used based on Bayes theorem in order to obtain the probabilities of being in the first or second situation knowing the value of the weight.

4. The estimation method as claimed in claim 1, in which the risk is calculated as a function of a value of instantaneous mass.

5. The estimation method as claimed in claim 1, in which the risk is calculated as a function of a set of estimated values of instantaneous mass.

6. The estimation method as claimed in claim 1, in which the interval within which the total weight of the vehicle is situated is determined by comparing the risks and by choosing a lowest risk.

7. The estimation method as claimed in claim 1, in which the controlling of the shock-absorber system includes adjusting a stiffness of the shock-absorber system.

8. The estimation method as claimed in claim 1, in which the controlling of the light system includes orienting a beam of the lighting system.

9. A device for estimating an interval within which a total weight of an automobile vehicle is situated, comprising: processing circuitry configured to: determine at least two intervals of weights, including a first situation in which the total weight of the vehicle belongs to the first interval and a second situation in which the total weight of the vehicle belongs to the second interval; calculate the probabilities of being in the first or second situation knowing a value of the weight; calculate a risk of choosing a wrong interval as a function of the calculated probabilities and of a cost associated with an erroneous decision, the wrong interval being an interval other than the interval within which the total weight of the vehicle is situated; determine the interval within which the total weight of the vehicle is situated as a function of the risk; and instruct a controller of at least one of an adjustment shock-absorber system and an orientation lighting system of the vehicle in response to the determined interval within which the total weight of the vehicle is situated.

10. The estimation device as claimed in claim 9, in which the processing circuitry is further configured, to:
  determine a set of estimations of weights using a database containing driving profiles; and
  calculate the probability that a value from the set of estimations of weights is situated in the first situation, the probability that a value from the set of estimations of weights is situated in the second situation, the probabilities of being in the first or second situation and the probability of finding a value of weight in all situations for all types of driving.

11. The estimation device as claimed in claim 10, in which the processing circuitry is further configured to:
  apply an algorithm using Bayes theorem.

12. The estimation device as claimed in claim 9, in which the risk is calculated as a function of a set of estimated values of instantaneous mass.

* * * * *